(12) United States Patent
Hairer et al.

(10) Patent No.: US 11,428,936 B2
(45) Date of Patent: Aug. 30, 2022

(54) DISPLAY ELEMENT, METHOD FOR PRODUCTION OF A DISPLAY ELEMENT AND USE OF A DISPLAY ELEMENT AND VEHICLE HAVING A DISPLAY ELEMENT

(71) Applicant: Bayerische Motoren Werke Aktiengesellschaft, Munich (DE)

(72) Inventors: Gabriel Hairer, Munich (DE); Michael Strolz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 16/582,781

(22) Filed: Sep. 25, 2019

(65) Prior Publication Data

US 2020/0018959 A1 Jan. 16, 2020

Related U.S. Application Data

(63) Continuation of application No. PCT/EP2018/056529, filed on Mar. 15, 2018.

(30) Foreign Application Priority Data

Mar. 28, 2017 (DE) ...................... 10 2017 205 246.5

(51) Int. Cl.
*G02B 27/01* (2006.01)
*B60K 37/06* (2006.01)
*B60R 11/02* (2006.01)

(52) U.S. Cl.
CPC .......... *G02B 27/0149* (2013.01); *B60K 37/06* (2013.01); *B60R 11/0264* (2013.01)

(58) Field of Classification Search
CPC ........................... G02B 27/0149; B60K 37/06
See application file for complete search history.

(56) References Cited

U.S. PATENT DOCUMENTS

2017/0326984 A1* 11/2017 Ling ..................... B60R 16/023
2020/0018959 A1* 1/2020 Hairer ................. B29C 45/1671

FOREIGN PATENT DOCUMENTS

| CN | 102650335 A | 8/2012 |
|---|---|---|
| CN | 103148203 A | 6/2013 |
| CN | 104121357 A | 10/2014 |
| CN | 104343960 A | 2/2015 |

(Continued)

OTHER PUBLICATIONS

Here's the Problem With Jeep's Recalled Gear Shifter—Jun. 21, 2016.*

(Continued)

*Primary Examiner* — David E Choi
(74) *Attorney, Agent, or Firm* — Crowell & Moring LLP

(57) ABSTRACT

A display element, in particular for a vehicle, that includes a decorative element and a multi-component plastic element, where the multi-component plastic element is connected to the decorative element. The multi-component plastic element includes a first plastic component and a second plastic component, where the second plastic component is in the form of an injection-molded symbol and is enclosed by the first plastic component such that the second plastic component is exposed on a top side of the display element. The first plastic component and the second plastic component have different colors.

7 Claims, 2 Drawing Sheets

(56) References Cited

FOREIGN PATENT DOCUMENTS

| | | |
|---|---|---|
| CN | 104972900 A | 10/2015 |
| CN | 105722715 A | 6/2016 |
| DE | 691 02 354 T2 | 12/1994 |
| DE | 10 2007 057 934 A1 | 6/2009 |
| DE | 10 2009 032 815 A1 | 1/2011 |
| DE | 10 2011 055 973 A1 | 8/2012 |
| DE | 10 2012 101 315 A1 | 8/2013 |
| DE | 10 2012 015 436 A1 | 2/2014 |
| DE | 10 2012 022 651 A1 | 5/2014 |
| DE | 10 2013 214 544 A1 | 1/2015 |
| DE | 10 2015 003 448 A1 | 8/2015 |
| DE | 20 2015 103 830 U1 | 7/2016 |
| EP | 2 765 570 A1 | 8/2014 |
| JP | 3-208616 A | 9/1991 |
| JP | 2000-215748 A | 8/2000 |
| WO | WO 2015/154939 A1 | 10/2015 |

OTHER PUBLICATIONS

Mercedes eclass shifter—2017 (Year: 2017).*
PCT/EP2018/056529, International Search Report dated Jul. 27, 2018 (Three (3) pages).
German Search Report issued in German counterpart application No. 10 2017 205 246.5 dated Feb. 9, 2018, with Statement of Relevancy (Seven (7) pages).
German-language European Office Action issued in European application No. 17 714 456.3-1012 dated Mar. 1, 2021 (Six (6) pages).
Partial English European Notice of Third-Party Observation issued in European Application No. 18714456.3-1012 / 3600971 dated Aug. 11, 2021 (Seven (7) pages).
Wikipedia, "Sieben Farbkontraste", URL: https://de.wikipedia.org/wiki/Sieben_Farbkontraste, Jun. 18, 2020, with English translation (Twenty (22) pages).
Chinese Office Action issued in Chinese application No. 201880007188.9 dated Mar. 11, 2022, with English translation (Fourteen (14) pages).

* cited by examiner

DISPLAY ELEMENT, METHOD FOR PRODUCTION OF A DISPLAY ELEMENT AND USE OF A DISPLAY ELEMENT AND VEHICLE HAVING A DISPLAY ELEMENT

CROSS REFERENCE TO RELATED APPLICATIONS

This application is a continuation of PCT International Application No. PCT/EP2018/056529, filed Mar. 15, 2018, which claims priority under 35 U.S.C. § 119 from German Patent Application No. 10 2017 205 246.5, filed Mar. 28, 2017, the entire disclosures of which are herein expressly incorporated by reference.

BACKGROUND AND SUMMARY OF THE INVENTION

The present invention relates to a display element, in particular for vehicles, and to a method for producing such a display element and also to the use of such a display element and to a vehicle having a display element.

Ceramic-based materials are commonly used as display elements of actuating devices, for example gear-selector switches, in vehicles. Such ceramic materials give the actuating devices a pleasant feel and, in addition, a high-quality appearance. However, ceramic components are expensive, for which reason additional plastic components are often used for representing the display symbols. For this purpose, sheets which are printed with symbols and have a level of scratch protection are adhesively bonded to ceramic surfaces. The production of such display elements is laborious and does not meet the requirements in relation to permanent mechanical stability. It is also known to have display elements of actuating devices in vehicles in which plastic symbols are introduced by means of injection molding into ceramic-surface cutouts which form the appropriate symbol shape. However, this involves a number of disadvantages. On the one hand, high development-related outlay is necessary and the appearance of these symbols, in addition, is not of high quality since the ceramic crosspieces are visible. Furthermore, producing the symbol-shaped cutouts in the ceramic surfaces causes a large amount of ceramic-material waste. Moreover, these display elements have a low level of stability since the ceramic crosspieces, for example the triangle in the letter "A", break easily. The sharp edges which appear on the ceramic surface when the symbol-shaped cutouts are produced also mean that an additional grinding step is necessary. This also leads to higher tool costs. DE 102013214544 A1 describes a ceramic molding in the form of a display element, in which use is made of a cutout in the form of a symbol and of a plate-form inlay. In this case, the disadvantages of the ceramic crosspieces are eliminated in that an inlay in the form of a plate, for example the triangle in the letter "A", is back-molded with the plastic for the symbol-shaped cutout. However, such inlays, along with having only a low level of mechanical loading capability, are very costly and can only be produced with a high level of technical outlay being involved.

Proceeding from this prior art, it is therefore an object of the present invention to specify a display element, in particular for vehicles, which has a high-quality appearance and feel, is distinguished by a high level of mechanical stability and can be produced cost-effectively and without high development-related outlay, high tool costs or high rates of material waste being involved. It is also an object of the present invention to specify a method for producing a display element which provides a display element which has a high-quality appearance and feel, and has a high level of mechanical stability, in a small number of cost-effective method steps and with a high variability in terms of patterns, colors and designs. It is a further object of the present invention to specify a vehicle having a display element and the use of a display element.

The object is achieved by a vehicle display element according to the invention. The display element comprises a decorative element and a multi-component plastic element, wherein the multi-component plastic element is connected to the decorative element. The decorative element here serves as a support or main body for the integration of a display function by way of the multi-component plastic element.

The multi-component plastic element serves to present the symbols for the display element. It is possible for the multi-component plastic element to be surrounded, for example in a form-fitting manner, in a cutout of the decorative element or to surround the decorative element in a form-fitting manner, a combination thereof likewise being possible. As an alternative, it is also possible to have an integral and/or force-fitting connection between the multi-component plastic element and the decorative element. Any desired combinations of the connecting techniques mentioned above can likewise be used.

The use of a multi-component plastic element also prevents any significant amount of material waste as far as the expensive decorative element is concerned, since the decorative element requires fewer machining steps, and the use thus helps to render the display element more cost-effective to produce. The multi-component plastic element is essentially not limited in respect of shape and design and can also have a large surface area, which reduces the need for the decorative element to undergo preliminary machining using special tools such as small milling machines or lasers, as a result of which it is possible to reduce tool costs.

In order also to meet the requirements in relation to a high level of mechanical stability, the multi-component plastic element has a first plastic component and a second plastic component. The second plastic component is visibly exposed, in the form of injection-molded symbols, on an upper side of the display element. The second plastic component is enclosed by the first plastic component, and this makes it possible to provide, for example, a mechanically very stable form-fitting and/or integral connection, which remains present for example even after the display element has been subjected to frequent mechanical loading. For example, such loading can be exerted by a user's finger, when the display element is, for example, a button which is coupled to an operating function. This makes it possible for example for the triangle in the letter "A" to be realized with a high level of mechanical stability.

It is possible here for the second plastic component to be arranged flush with the upper side of the first plastic component, in an elevated state in relation to the upper side of the first plastic component or in a recessed state in relation to the upper side of the first plastic component, as long as it is exposed on the upper side of the display element and is enclosed by the first plastic component. This upgrades both the feel and the appearance of the display element and allows for different design possibilities.

For example, the multi-component plastic element can consist of two components.

The first and second plastic components are each injection molded, which can be realized, for example, by a known injection-molding method. This makes it possible for precisely fashioned symbols of different sizes, and with exact contrasts between the first and the second plastic components, to be realized quickly, straightforwardly and in a variable manner without any laborious process-tool change-over or development adaptations. This lowers the production and developments costs for the display element according to the invention. Furthermore, the injection-molded symbols and the resulting contrasts, and also the transition between the multi-component plastic element and the decorative element, give rise to appealing, high-quality structures in terms of appearance and feel.

The first and the second plastic components are each of different colors. It is thus possible to realize a multiplicity of color gradations and contrasts for the display element according to the invention. The straightforward adaptability of the plastic components, as desired, in respect of color, in particular in injection molding, thus means that a high variability in design is possible.

The structure and configuration of the elements of the display element according to the invention mean that the latter has a high-quality appearance and feel, is mechanically very stable and is cost-effective and also can be produced straightforwardly and without high tool costs, high rates of material waste and high development-related outlay being involved. Furthermore, the display element according to the invention is distinguished by a high variability in design, which provides for its universal use as a display element, in particular in vehicles.

According to an advantageous development, the decorative element comprises ceramic material, wood, wood veneer, glass, stone or a combination thereof. Decorative elements made of the materials given above are very easy to process and produce decorative elements having a pleasant feel and pleasing appearance along with very good mechanical stability.

The decorative element further advantageously consists of ceramic material. As a result, the display element according to the invention can meet particularly stringent quality requirements in relation to appearance and feel and, in addition, is characterized by very good, permanent mechanical stability.

A further advantageous development is distinguished in that the second plastic component is black and the first plastic component is white or the first plastic component is black and the second plastic component is white. It is possible here to create a maximum color contrast which, in accordance with the individual requirements of the user, highlights the symbols differently. In other words, it is possible to choose whether white on black or black on white is a preferred option. The use of injection molding can enhance the contrast further.

In order to create the highest possible variability in design for the display element according to the invention, the injection-molded symbols advantageously comprise a letter, an image, a number or combinations thereof, the option also being present for a plurality of letters, images or numbers to be provided. Designs and patterns of any kind are therefore possible. International letters, e.g., Asian letters, in particular Chinese letters, Japanese letters, Indian letters or Arabic letters, are also possible. This achieves a particularly high level of market acceptance, in particular worldwide. Furthermore, the images can be colored or black and white.

It is also advantageous for the decorative element to be surrounded by an inner surface of the first plastic component. This means that a side of the first plastic component which is directed toward the decorative element fully covers the decorative element, for example on the upper surface thereof, and also encloses the peripheral region thereof. With the exception of the injection-molded symbols of the second plastic element, the entire surface of the display element is thus formed exclusively by the first plastic element. This means that any edges, for example ground edges, which are present on the decorative element can be covered. Therefore, surrounding the decorative element by the inner surface of the plastic component increases the user safety while also optimizing the feel. The pleasing appearance of the decorative element is maintained here, however, by the non-surrounded surface of the decorative element.

In order to provide a display element which is even more stable in mechanical terms, the multi-component plastic element is advantageously arranged in a cutout of the decorative element. This gives rise to an even more mechanically stable form-fitting connection between the multi-component plastic element and, in particular, the walls of the cutout.

It is also advantageous for the multi-component plastic element to be arranged in the cutout at the same time as the plastic-element surround is realized, in order to create additional mechanical stability of the display element. It is possible for the cutout to be, for example, hemispherical, to be a blind bore, to be partially ellipsoidal or to be in other three-dimensional geometrical shapes and to be produced using conventional techniques such as, for example, drilling or grinding or milling.

The invention also discloses a method for producing a display element as described above. The method comprises, in a first step, providing a decorative element. Depending on its material, the decorative element can be prepared correspondingly. It is possible here, for example, for cutouts, spikes or holes or combinations thereof to be formed in the decorative element to provide for better fastening of the multi-component plastic element. The decorative element can thus be obtained straightforwardly in any shape which is necessary for its use in each case. As already explained above, decorative elements are used as main bodies or supports, these having a high-quality appearance and feel.

In a further step, the method comprises manufacturing the multi-component plastic element and connecting the multi-component plastic element to the decorative element. This means that the production method according to the invention can be implemented in a small number of steps and is therefore cost-effective. Connecting the multi-component plastic element to the decorative element gives rise to a stable connection, which results in a mechanically stable display element.

Connection of the multi-component plastic element to the decorative element can advantageously take place using integral and/or form-fitting connections, the result being a mechanically very stable display element which can be subjected to loading. The multi-component plastic element can be connected for example in a form-fitting manner to a cutout or a spike of the decorative element or a combination thereof.

The operation of manufacturing the multi-component plastic element comprises either the steps of injection molding the first component and then injection molding the second component or the steps of injection molding the second plastic component and then injection molding the first plastic component. The second plastic component here is injection molded in the form of symbols, and these are therefore enclosed by the first plastic component. The injection molding here takes place such that the second plastic component is exposed on the upper side, in order for the symbols to be more easily distinguishable. The second plastic component can thus be fastened in a form-fitting and/or integral manner, and thus in a mechanically very stable manner. This makes it possible to obtain, in addition, a high-quality appearance and pleasant feel between the plastic components of the multi-component plastic element and the decorative element. The injection molding of the first plastic component prior to the second plastic component is advantageous in particular when the symbols are straightforward ones which can be injection molded quickly and straightforwardly. If the symbols, in contrast, are complex ones, then the second plastic component is advantageously injection molded prior to the first plastic component, since otherwise, if machining takes a relatively long time, the plasticity of the first plastic component alters and the mechanical connection between the first plastic component and the second plastic component is less stable. The second plastic component can be fixed here, for example, using a robot arm.

Injection molding provides for high variability in respect of the shapes, of the patterns, of the designs and of the colors of the multi-component plastic element. It is thus possible for the multi-component plastic element to comprise, for example, colored images, numbers, letters or a daytime or a night-time design. The selection of plastic-handling process, symbol geometry and material allows a multiplicity of motifs to be represented in a precise manner by the method according to the invention for producing a display element. The method can thus be used for a multiplicity of display elements without any further development optimization being necessary. Separating the operations of forming the decorative element and of manufacturing the multi-component plastic element also makes it possible to reduce tool-related and development costs.

The method according to the invention can be implemented cost-effectively in a small number of steps, with tool-related and development costs being reduced, and makes it possible to produce a display element with a high level of mechanical stability and a high-quality feel and pleasing appearance. The method according to the invention, in addition, makes it possible to produce a multiplicity of motifs for the display element without a high level of technical outlay being involved. The variability in design is therefore very high.

The invention also specifies a display element as disclosed above being used in an instrument panel for vehicles or in a gear-selector switch for vehicles or in a door-trim panel for vehicles.

The use according to the invention makes it possible to provide instrument panels, gear-selector switches or door-trim panels for vehicles which have a high level of mechanical stability, a high-quality feel and pleasing appearance and are cost-effective to produce.

The invention also describes a vehicle which comprises the display element disclosed above. The display element is distinguished by a pleasant feel and pleasing appearance.

The advantages, advantageous effects and developments described for the display element according to the invention also apply to the method according to the invention for producing a display element, to the vehicle according to the invention and to the use according to the invention of a display element.

Further details, features and advantages of the invention can be gathered from the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
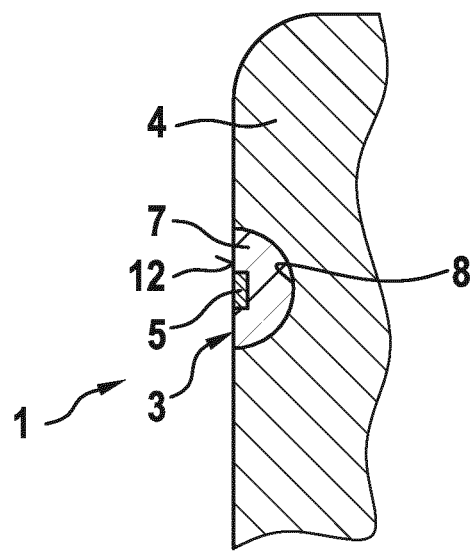
FIG. 1 shows a sectional view of a display element according to a first embodiment.

The present invention will be explained in detail with reference to exemplary embodiments. The figures illustrate all the essential features of the invention. For the sake of clarity, all the rest of the features have been left out. Furthermore, the same reference characters denote the same elements.

FIG. 1 shows a section view of a detail of a display element 1 according to one embodiment of the invention. The display element 1 is designed, in particular, for arrangement in a vehicle, for example for an actuating device in an instrument panel, and comprises a decorative element 4 having a cutout 8, in which a multi-component plastic element 3 is arranged preferably in an integral and/or form-fitting manner. For further fastening of the multi-component plastic element 3, use can be made of spikes or further cutouts, for example bores, or a combination thereof (not shown in the figure). This achieves a high level of mechanical stability.

The decorative element 4 comprises ceramic material, wood, wood veneer, glass, stone or a combination thereof, in particular ceramic material, and can be made into any desired shape by known material-machining methods, e.g., grinding, drilling, turning, sawing or milling, as a result of which the display element can be configured with a high-quality feel and appearance.

The cutout 8 is present in the decorative element 4 in the form of a cavity and serves to connect the decorative element 4 to the multi-component plastic element 3. It is possible for the cutout 8 to be, for example, hemispherical, to be a blind bore, to be partially ellipsoidal or to be in other three-dimensional geometrical shapes and to be produced using conventional techniques, for example drilling or grinding or milling.

The multi-component plastic element 3 comprises a first plastic component 7 and a second plastic component 5, wherein the second plastic component 5 is enclosed by the first plastic component 7 such that it is exposed on the upper side 12 of the display element 1 and is present in the form of a symbol. This ensures a pleasant feel and a pleasing appearance. The two plastic components 5, 7 here establish preferably a form-fitting and/or integral connection with one another, as a result of which the multi-component plastic element is very stable in relation to loading. The two plastic components 5, 7 are introduced by injection molding, wherein preferably the first plastic component 7 ensures the form-fitting connection of the multi-component plastic element 3 to the decorative element 4. For this purpose, use can be made of all plastics which are suitable for injection molding, which has an advantageous effect on the procedural economy.

The first plastic component 7 and the second plastic component 5 are of different colors, wherein the first plastic component 7 is, for example, black and the second plastic component 5 is, for example, white, or vice versa, to make the symbol stand out particularly well. It is a straightforward matter here to choose between daytime design and nighttime design. The symbols comprise, for example, letters, images, numbers or combinations thereof, and this achieves a high variability in design.

Figure 2:
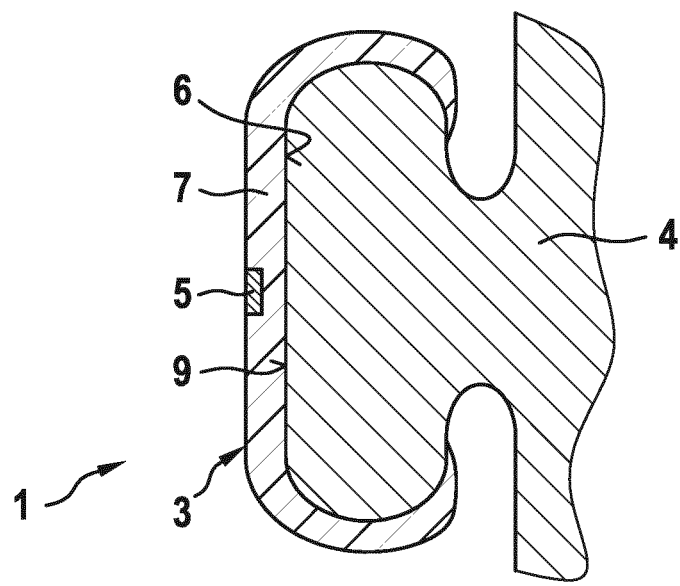
FIG. 2 shows a sectional view of a display element according to a second embodiment.

FIG. 2 shows a display element 1 in section, the decorative element 4 being surrounded, preferably in a form-fitting manner, by an inner surface 6 of the first plastic component 7 of the multi-component plastic element 3. The first plastic component 7 thus covers at least one sub-region of an upper surface 9 of the decorative element 4. The pleasing appearance of the decorative element is nevertheless maintained outside the surrounded surface. This is achieved by the first plastic component 7 being injection molded onto the correspondingly shaped upper surface 9 of the decorative element 4.

The display element 1 from FIG. 2 is distinguished by a high level of mechanical stability, straightforward and cost-effective production capability and a high-quality feel and appearance.

In an alternative embodiment, the operations of surrounding the decorative element 4 by the inner surface 6 of the first plastic component 7 and of arranging the multi-component plastic element 3 in the cutout 8 can advantageously be combined, in order to achieve an even higher level of mechanical stability (not shown in the figures).

Figure 3:
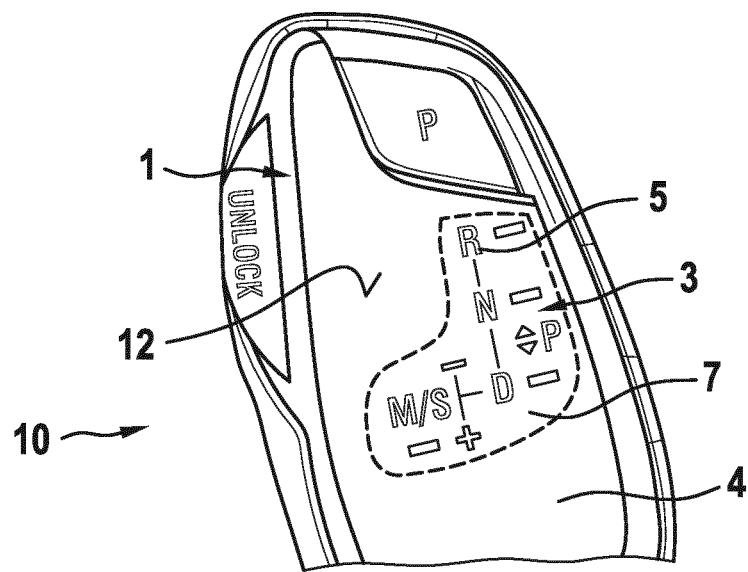
FIG. 3 shows a schematic illustration of a gear-selector switch having a display element according to one embodiment.

FIG. 3 shows a gear-selector switch 10 which comprises a decorative element 4. A multi-component plastic element 3, comprising a first plastic component 7 and a second plastic component 5, together with the decorative element 4 forms a display element 1, which serves as a gear-shift display for the gear-selector switch 10. The second plastic component 5 is present in the form of injection-molded symbols, namely numbers, letters and patterns, and is clearly visible as a result of being exposed on the upper side 12 of the display element 1. As a result of the second plastic component 5 being surrounded by the first plastic component 7, the injection-molded symbols are stabilized to very good effect in terms of shape and dimension. This makes it possible to achieve a high variability in design, a high level of mechanical stability and a high-quality feel and appearance. In addition, the display element 1 can be designed as in the embodiments of FIGS. 1 and 2.

Figure 4:
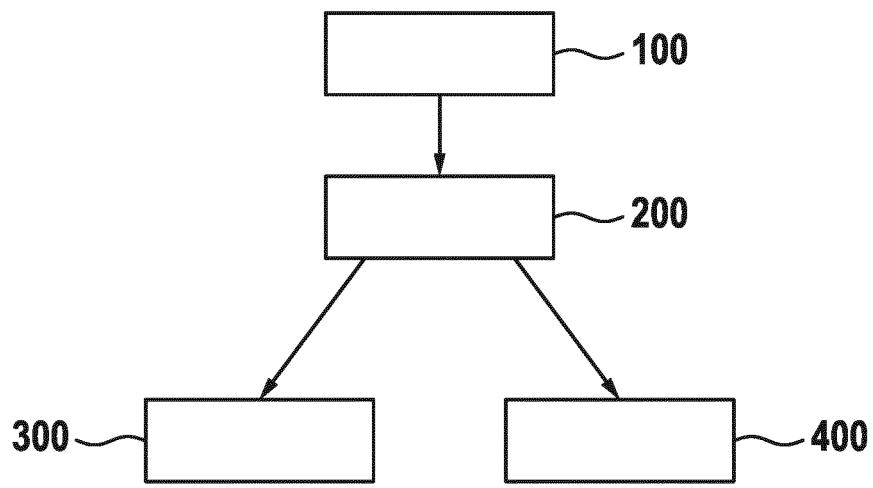
FIG. 4 shows a schematic flow diagram for demonstrating a method for producing a display element according to one embodiment of the invention.

FIG. 4 gives a detailed overview of steps of a method for producing a display element 1 according to one embodiment of the invention. The decorative element 4 is provided in a first step 100. For this purpose, the decorative element 4 can be made into an appropriate shape beforehand, which can take place, for example, by means of conventional methods, for example by turning, milling, drilling, sawing or 3D printing, and this results in a high cost-saving potential for the process.

In a second step 200, a multi-component plastic element 3 is manufactured and is connected to the decorative element 4 by a form-fitting and/or integral and/or force-fitting connection, this ensuring a high level of mechanical stability and a pleasant feel and a pleasing appearance.

On the one hand, this can be done using step 300, which comprises first of all injection molding the first plastic component 7 and then injection molding the second plastic component 5. The second plastic component 5 here forms the symbols in an upper side of the first plastic component 7, which encloses the second plastic component 5 in particular in a form-fitting and/or integral manner, this resulting in a pleasant feel and a pleasing appearance and good mechanical stability. The first plastic component 7 is fastened on the upper surface of the decorative element 4 here for example by way of a form-fitting connection. The connection or fastening can take place, for example, by spikes on the decorative element 4, by a cutout in the decorative element 4, or by the decorative element 4 being surrounded, or by a combination thereof.

As an alternative, the method can use step 400, which provides first of all injection molding of the second plastic component 5 and then injection molding of the first plastic component 7. It is possible here to fix the second plastic component 5, for example using a robot arm, whereafter it is back-molded with the first plastic component 7, the result being a form-fitting and/or integral connection. The connection or fastening takes place, in particular, as in the alternative mentioned above.

The injection molding provides for low production and development costs and a pleasing appearance and a pleasant feel as far as the multi-component plastic element 3 is concerned. It is also possible to realize straightforward modifications for a large number of shapes, patterns and designs.

It is therefore possible to provide a cost-effective and straightforward method which can produce a mechanically very stable display element 1 having a high-quality feel and a pleasing appearance. The method additionally provides for a large number of modifications as far as designs, patterns, colors and shapes of the display element 1 are concerned.

LIST OF REFERENCE CHARACTERS

1 Display element
3 Multi-component plastic element
4 Decorative element
5 Second plastic component
6 Inner surface
7 First plastic component
8 Cutout
9 Upper surface of the decorative element
10 Gear-selector switch
12 Upper side of the display element
100 Method step
200 Method step
300 Method step
400 Method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display element, comprising:
    a decorative element; and
    a multi-component plastic element, wherein the multi-component plastic element is connected to the decorative element;
    wherein the multi-component plastic element includes a first plastic component and a second plastic component, wherein the second plastic component is in a form of an injection-molded symbol, wherein the first plastic component is an injection molded component, wherein the second plastic component is enclosed by the first plastic component such that the second plastic component is exposed on an upper side of the display element, wherein the first plastic component and the second plastic component are of different colors, wherein an entirety of the first plastic component and the second plastic component of the multi-component plastic element is disposed in a cutout of the decorative element, wherein the cutout is a blind bore with walls, and wherein the multi-component plastic element is connected to the walls of the cutout.

2. The display element according to claim 1, wherein the decorative element comprises a ceramic material, a wood, a wood veneer, a glass, a stone, or a combination thereof.

3. The display element according to claim 1, wherein the decorative element consists of a ceramic material.

4. The display element according to claim 1, wherein the second plastic component is a black color and the first plastic component is a white color or the first plastic component is the black color and the second plastic component is the white color.

5. The display element according to claim 1, wherein the injection-molded symbol is an image, a letter, a number or combinations thereof.

6. A method for producing a display element according to claim 1, comprising the acts of:
provide the decorative element; and
manufacturing the multi-component plastic element and connecting the multi-component plastic element to the walls of the cutout of the decorative element;
wherein the act of manufacturing includes injection molding the first plastic component followed by injection molding the second plastic component or injection molding the second plastic component followed by injection molding the first plastic component.

7. A use of the display element according to claim 1 in an instrument panel for a vehicle or in a gear-selector switch for a vehicle or in a door-trim panel for a vehicle.

* * * * *